United States Patent
Huang et al.

(10) Patent No.: US 7,114,941 B2
(45) Date of Patent: Oct. 3, 2006

(54) HOT EMBOSSING AUTO-LEVELING APPARATUS AND METHOD

(75) Inventors: Jung Yan Huang, Hsinchu (TW); Chu Shu Tsai, Taipei (TW); Choung-Lii Chao, Yong-Ho (TW); Chuan Kang Mu, Taichung (TW); Jauh Jung Yang, Taipei (TW); Cheng-Chun Huang, Miaoli (TW); Ming Yueh Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 214 days.

(21) Appl. No.: 10/393,891

(22) Filed: Mar. 20, 2003

(65) Prior Publication Data

US 2004/0119199 A1  Jun. 24, 2004

(30) Foreign Application Priority Data

Dec. 24, 2002  (TW) ............................... 91137217 A

(51) Int. Cl.
*B29C 59/02* (2006.01)

(52) U.S. Cl. ................. 425/193; 425/388; 425/406; 100/258 R

(58) Field of Classification Search ............... 425/127, 425/128, 192, 195 R, 406, 193; 100/258 A; 438/107–108, 127
See application file for complete search history.

(56) References Cited

U.S. PATENT DOCUMENTS

| 5,478,231 | A | * | 12/1995 | Hehl ........................ 425/589 |
| 5,989,471 | A | * | 11/1999 | Lian et al. ................ 425/406 |
| 6,012,711 | A | * | 1/2000 | Cipolla ..................... 269/21 |
| 6,471,501 | B1 | * | 10/2002 | Shinma et al. ............ 425/127 |
| 6,561,086 | B1 | * | 5/2003 | Miyachi et al. ......... 100/258 R |

* cited by examiner

*Primary Examiner*—Yogendra N. Gupta
*Assistant Examiner*—Thu Khanh T. Nguyen
(74) *Attorney, Agent, or Firm*—Pro-Techtor Int'l Services

(57) ABSTRACT

A hot embossing auto-leveling apparatus which has an air-floating spherical bearing between a lower mold and a base, placed in a depression on the base, with the base housing an air inlet and an air outlet. A hot embossing auto-leveling method, comprising the steps of (1) performing an upward and downward coupling movement of the lower and upper molds; (2) adjusting the lower mold against the upper mold using the air-floating spherical bearing; (3) fixing the lower mold by under pressure in an orientation parallel to the upper mold; (4) placing a molded part on the lower mold; (5) evacuating, heating and pressurizing a working chamber; (6) cooling; and (7) opening.

6 Claims, 3 Drawing Sheets

HOT EMBOSSING AUTO-LEVELING APPARATUS AND METHOD

FIELD OF THE INVENTION

The present invention relates to a hot embossing auto-leveling apparatus and method, particularly to a dynamic auto-leveling apparatus and method which before every molding step performs a vertical and horizontal leveling movement for maintaining precision and parallelism of upper and lower molds, performing auto-leveling while a relatively good mold is molded against a stamper and high-molecular material, so that the shortcoming of conventional molds which do not allow for controlling alignment and parallelism is avoided.

DESCRIPTION OF RELATED ART

When conventional hot embossing is conducted, upper and lower molds in fixed positions are used, fixing alignment and parallelism at the time of installation. With the tendency of molding parts by embossing the dimensions of which are in the range of micrometers or even nanometers, the influence of alignment and parallelism has become significant.

If a mold having a diameter of 150 mm is misaligned by as little as 0.01°, a maximum displacement of 26 µm results (calculated using 150 mm×sin 0.01°=0.0261 mm=26.1 µm). As the above discussion shows, if misalignment and imperfect parallelism of upper and lower molds exceed the dimensions of the microstructure of the stamper, then the stamper and the produced part do not fit together. This does not only lead to difficulties of demolding, but also bears the risk of breaking of the produced part due to external pressure of the stamper.

Molds for hot embossing are made by precise working to achieve parallelism of the upper and lower molds. However, there is no way directly to control tolerances. Therefore, based on a given height and a given diameter and on changes of density of worked parts, a rotating wedge-shaped piece is used to adjust working and base surfaces within a certain range to be parallel. After prolonged use under high temperature and pressure, however, alignment and parallelism of the two surfaces are hard to maintain within tolerances. The auto-leveling function of the present invention has the advantage of performing automatic leveling before every molding, so that hot embossing is performed under optimal conditions of the two surfaces, avoiding deviations from parallelism of the two surfaces to develop. Hot embossing requires exact vertical movements. A small deviation in an upward movement will lead to poor fitting of the stamper on the worked part, causing damage at demolding. Furthermore, even small misalignments greatly impair worked parts on a micro-scale.

SUMMARY OF THE INVENTION

It is the main object of the present invention to provide a hot embossing auto-leveling apparatus which has an air-floating spherical bearing between a lower mold and a base, placed in a depression on the base, with the base housing an air inlet and an air outlet.

Another object of the present invention is to provide a hot embossing auto-leveling method, comprising the steps of (1) performing an upward and downward coupling movement of the lower and upper molds; (2) adjusting the lower mold against the upper mold using the air-floating spherical bearing; (3) fixing the lower mold by under pressure in an orientation parallel to the upper mold; (4) placing a molded part on the lower mold; (5) evacuating, heating and pressurizing a working chamber; (6) cooling; and (7) opening.

The present invention can be more fully understood by reference to the following description and accompanying drawings.

DETAILED DESCRIPTION OF THE PREFERRED EMBODIMENT

As shown in FIG. 1, the hot embossing auto-leveling apparatus of the present invention is used in conjunction with a molding machine 10 (e.g., a hot embossing machine) and comprises an upper mold 11 and a lower mold 12 having working surfaces 111, 121, respectively, between which a stamper and a molded part are accommodated. A base 20 supports the lower mold 12. Between the base 20 and the lower mold 12, an upward-acting dual-function spherical bearing 30 is placed. An air inlet 22 is led through the base 20, supplying compressed air, and a vacuum port 23, passing through the base 20, is connected with a vacuum pump for pumping away air.

Referring to FIGS. 1 and 2, before a molded part is inserted between the upper and lower molds 11, 12 of the molding machine 10, the upper and lower molds 11, 12 perform an upward and downward coupling movement. In this state, when compressed air is led through the air inlet 22 below the dual-function spherical bearing 30, the bearing 30 becomes an air-floating bearing and the lower mold 12 is pushed upward towards the upper mold 11, as shown in FIG. 1.

As shown in FIG. 3, when the upper and lower molds 11, 12 are connected, with the upper and lower working surfaces touching with each other, due to frictionless floating of the dual-function spherical bearing 30 in the air-floating mode, the lower mold 12 is adjusted, so that the upper and lower working surfaces are entirely in contact with each other achieving the desired pre-alignment position.

Referring to FIG. 4, when pressure is applied, due to the smooth curve of the shift of the lower mold 12, after reducing the flow of compressed air, the upper and lower molds 11, 12 are tightly held together. At this time, the flow of compressed air is turned off by closing a control valve (not shown), and the vacuum pump is switched on, so that the dual-function spherical bearing becomes a vacuum fixing device and the lower mold 12 is fixed by vacuum in the desired pre-alignment position. Preferably, the lower mold 12 is fixed in addition by mechanical means, like a wedge or a pin.

Referring to FIG. 5, since the lower mold 12 is fixed by vacuum, separating the upper mold 11 from the lower mold 12 does not impair the parallel orientation of the upper and lower molds 11, 12.

Referring to FIG. 6, a molded part 40 is inserted between the working surfaces 111, 121 of the upper and lower molds II, 12. The working chamber is evacuated and heated to an appropriate processing temperature, and molding is performed by sustained pressure. Finally, the working chamber is allowed to cool and opened, finishing the molding process.

As the above explanation shows, the hot embossing auto-leveling method of the present invention comprises the following steps:

1. Placing the air-floating spherical bearing on the base.
2. Mounting the lower mold on the air-floating spherical bearing.

3. Performing an upward and downward coupling movement of the lower mold against the upper mold.
4. Orienting the lower mold parallel to the upper mold using the air-floating spherical bearing.
5. Fixing the lower mold by under pressure in an orientation parallel to the upper mold.
6. Placing a molded part on the working surface of the lower mold, with the stamper on the upper mold in contact with the molded part.
7. Evacuating and heating the working chamber to an appropriate processing temperature and performing molding by sustained pressure.
8. Cooling the molded part.
9. Opening the molds.

The present invention has the following advantages:
1. Automatic aligning and parallel orienting ensures precision.
2. Alignment and parallelism are controlled before every single molding procedure.
3. The problems of mutual interfering stamper and molding part and of difficult demolding are reduced.
4. Eliminating displacements at micro-molding occurring during upward and downward movements.
5. By automatic adjustment before each molding procedure, alignment and parallelism are maintained.
6. Tolerances do not need to be considered, enhancing reliability.
7. By using the air-floating spherical bearing for aligning and by fixing the lower mold by under pressure, parallelism of the upper and lower molds is maintained.

Figure 1:
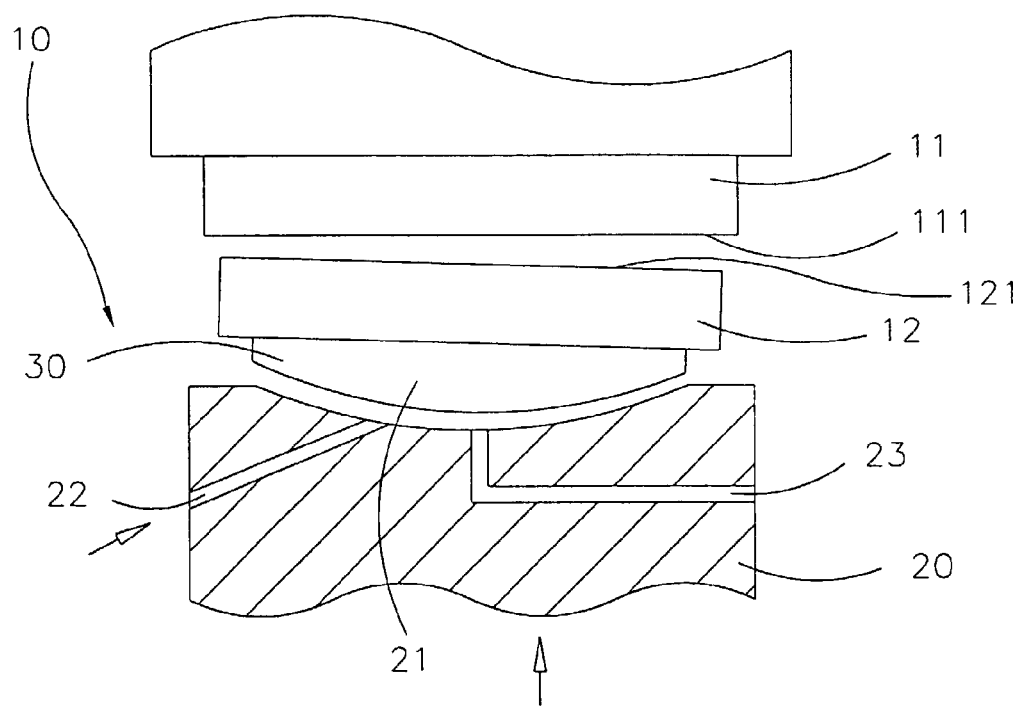
FIG. 1 is a schematic illustration of the hot embossing auto-leveling apparatus of the present invention before molding, with the lower mold slowly approaching the upper mold.
Figure 2:
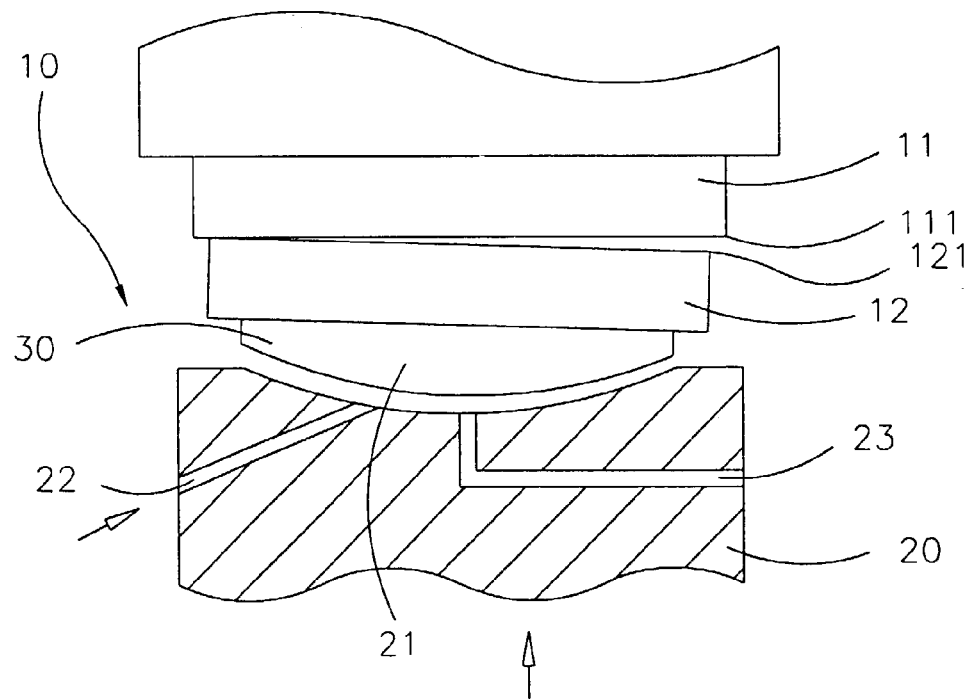
FIG. 2 is a schematic illustration of the hot embossing auto-leveling apparatus of the present invention during the coupling movement before molding, with the lower mold touching the upper mold.
Figure 3:
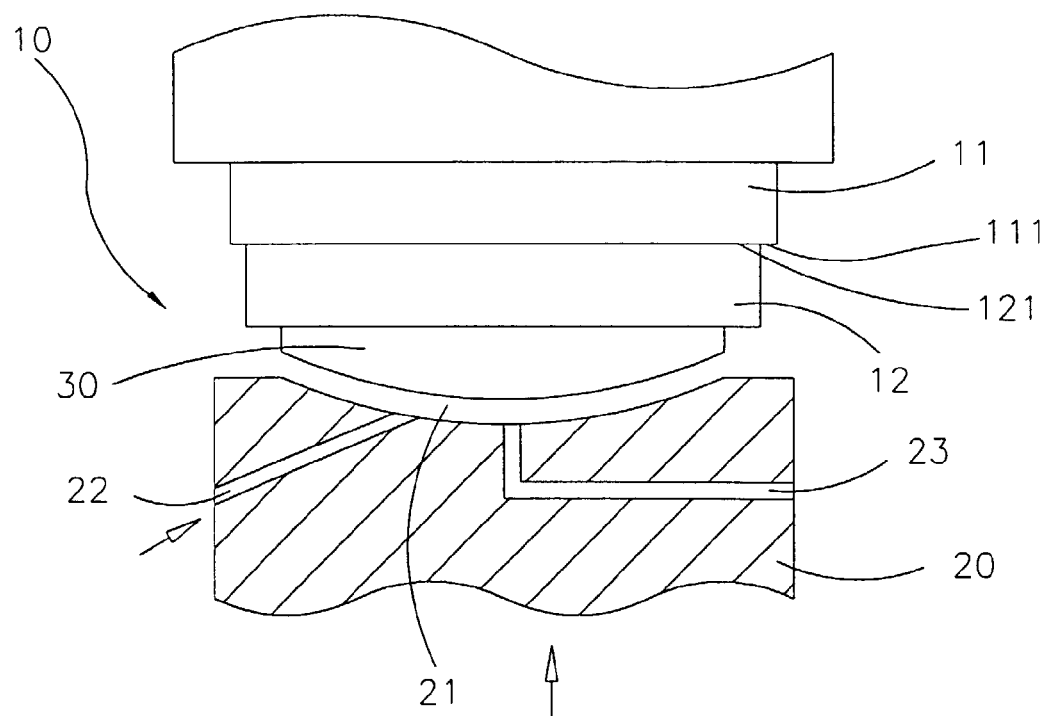
FIG. 3 is a schematic illustration of the hot embossing auto-leveling apparatus of the present invention, with the lower mold being oriented parallel to the upper mold using the air-floating spherical bearing.
Figure 4:
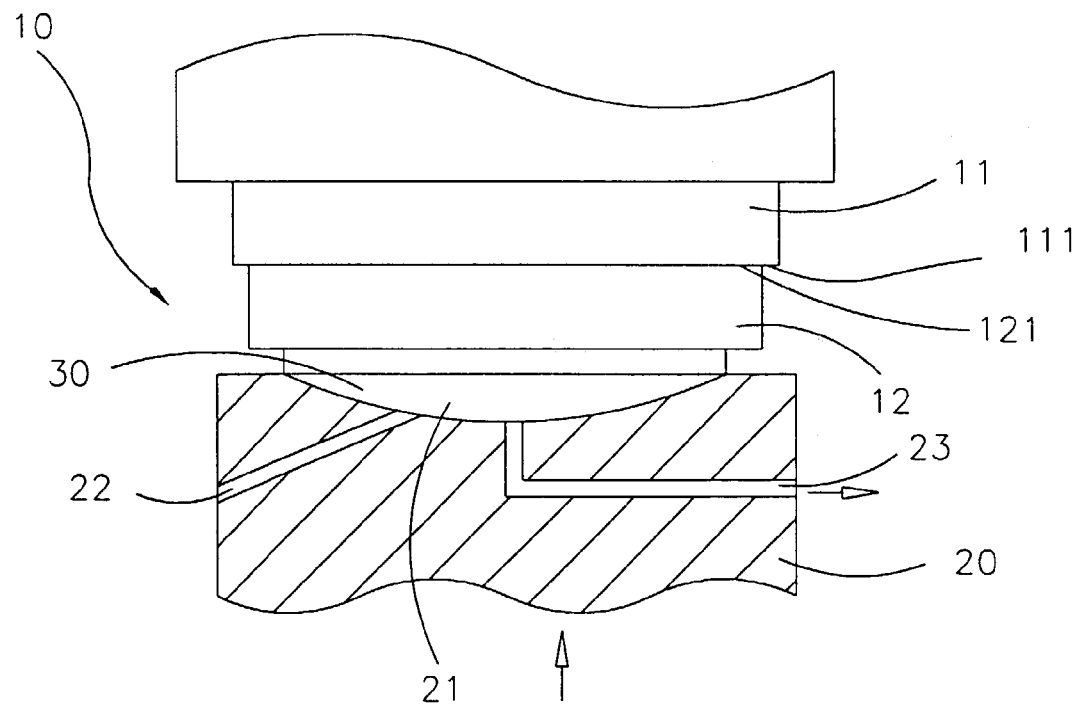
FIG. 4 is a schematic illustration of the hot embossing auto-leveling apparatus of the present invention, with the lower mold being fixed by under pressure.
Figure 5:
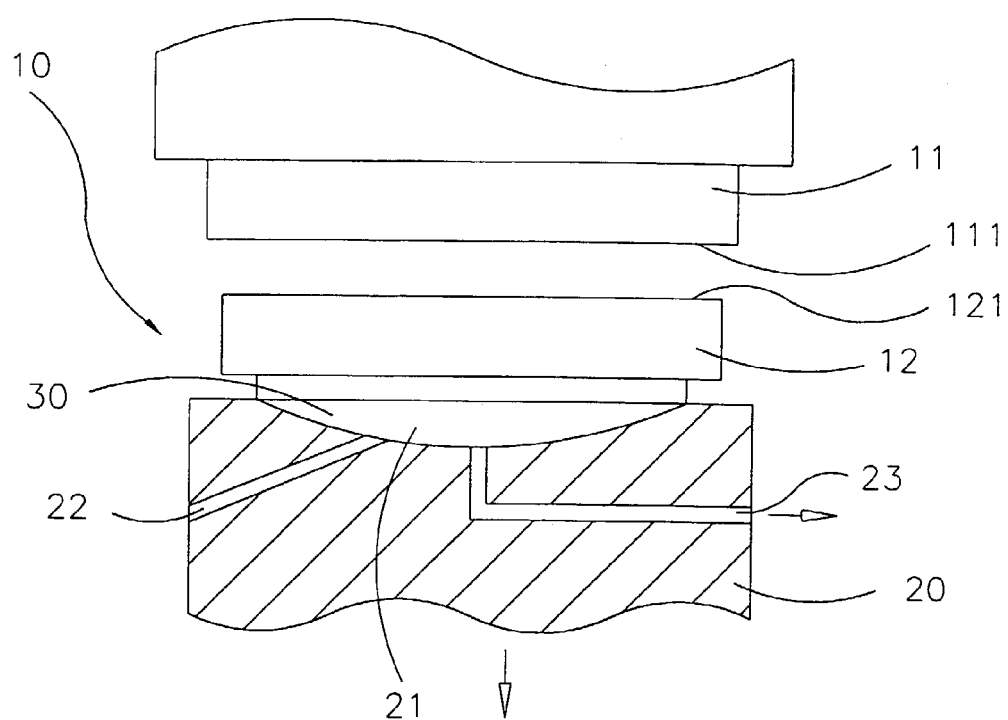
FIG. 5 is a schematic illustration of the hot embossing auto-leveling apparatus of the present invention, with the lower mold being separated from the upper mold.
Figure 6:
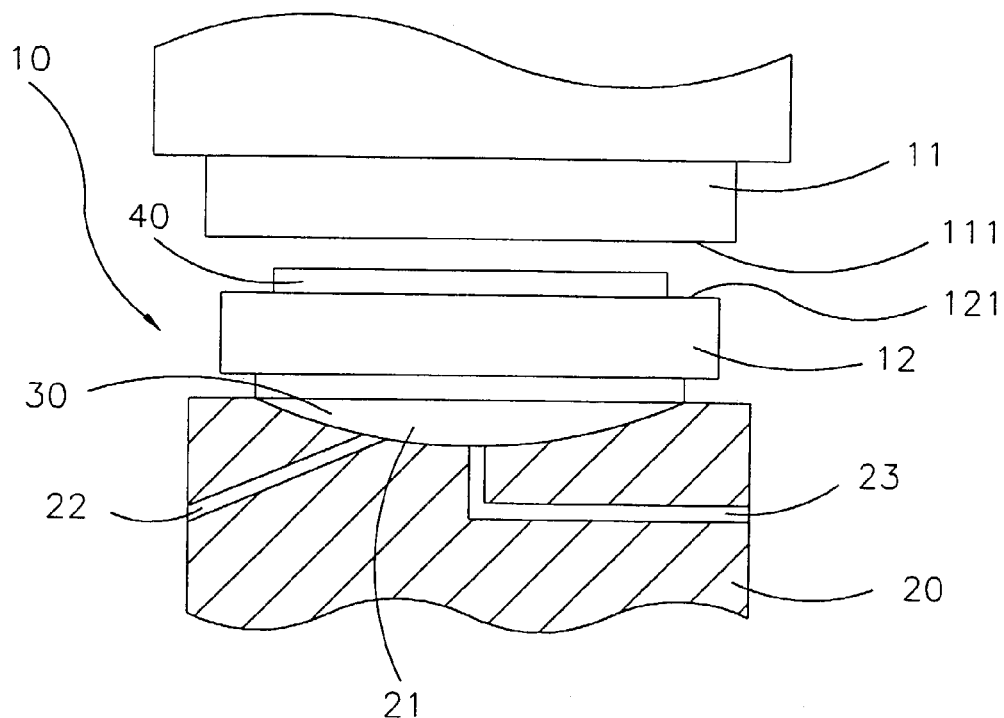
FIG. 6 is a schematic illustration of the hot embossing auto-leveling apparatus of the present invention, with a molded part being placed on the lower mold.

The invention claimed is:

1. A hot embossing auto-leveling apparatus, comprising:
a base having an upper side;
an upward-acting dual-function spherical air bearing, disposed in an accommodating depression on said upper side of said base, said accommodating depression being connected to an air inlet and to a vacuum port;
a lower mold, set on said dual-function spherical air bearing;
an upper mold, placed above and facing said lower mold;
said upward-acting dual-function spherical air bearing being
an air-floating spherical air bearing when compressed air is supplied to said air inlet, thereby lifting and allowing said lower mold to achieve accurate pre-alignment with said upper mold; and said upward-acting dual-function spherical air bearing being
a vacuum fixing device when the compressed air supply is removed from said air inlet and a vacuum is applied to said vacuum port,
wherein said lower mold is fixed in its position of pre-alignment with said upper mold during the pre-alignment process by said vacuum applied to said air bearing without requiring a mechanical assist mechanism for fixing.

2. The hot embossing auto-leveling apparatus according to claim 1, wherein said upper side of said base has a depression in the shape of a portion of a sphere, accommodating said upward-acting dual-function spherical bearing.

3. The hot embossing auto-leveling apparatus according to claim 1, wherein compressed air is led through said air inlet, lifting said upward-acting dual-function spherical bearing, causing said lower mold slowly to approach and achieve pre-alignment with said upper mold.

4. The hot embossing auto-leveling apparatus according to claim 1, wherein
said vacuum port is connected with a vacuum pump, which, when operating and air supply is removed from said air inlet, causes said lower mold on said upward-acting dual-function spherical bearing to be fixed in position by vacuum.

5. The hot embossing auto-leveling apparatus according to claim 1,
wherein molding is performed by hot embossing.

6. The hot embossing auto-leveling apparatus according to claim 2,
wherein said upward-acting dual-function spherical bearing is a floating bearing having a surface with the shape of a portion of a sphere.

* * * * *